Jan. 5, 1960  L. H. MAY  2,920,210
WELDING GENERATOR ATTACHMENT FOR MOTOR VEHICLES
Filed Nov. 10, 1958
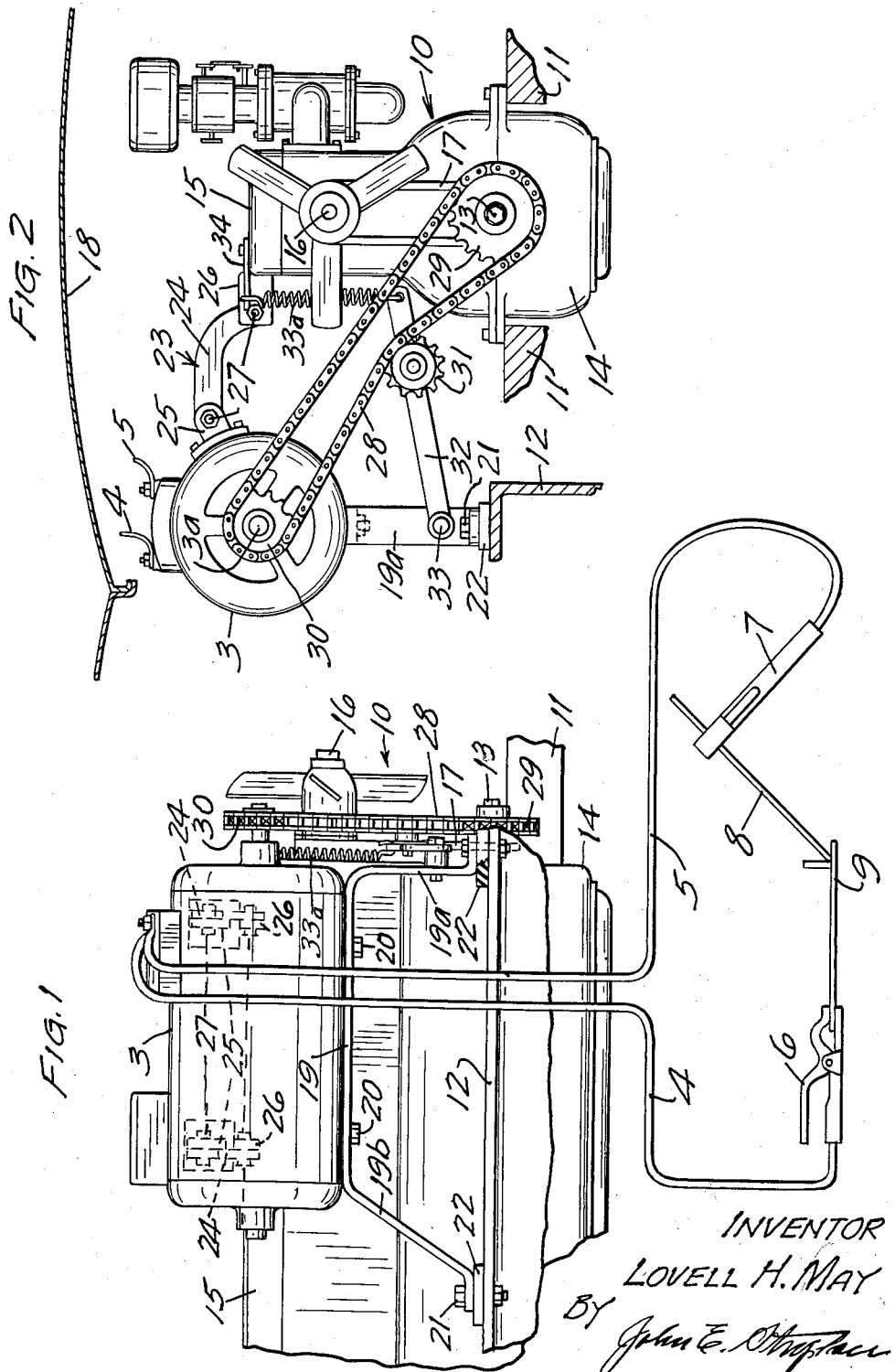
INVENTOR
LOVELL H. MAY
BY
ATTORNEY

United States Patent Office 2,920,210
Patented Jan. 5, 1960

2,920,210
WELDING GENERATOR ATTACHMENT FOR MOTOR VEHICLES

Lovell H. May, St. Paul, Minn.

Application November 10, 1958, Serial No. 772,789

4 Claims. (Cl. 290—1)

This invention relates to improved means for attaching a welding generator to a motor vehicle and has for its principal objects to provide novel, low cost and unusually compact means for mounting an electric generator of the size and capacity suitable for welding beneath the engine hood of a truck or other motor vehicle of common type, and for transmitting power directly from the front end of the vehicle engine crank-shaft to the generator shaft whereby the generator may be operated and its output regulated by adjustment of the speed of the vehicle engine.

Heretofore electric welding generators have been mounted on trucks and tractors and operatively connected to power take-off shafts provided on the vehicles. Since many otherwise suitable trucks and passenger cars are not equipped with power take-off, the field of use of such generators is limited. Other portable electric welders have been provided with separate internal combustion engines and operatively connected to direct current generators suitable for welding. These units have been mounted on the pay-load-carrying floor of the vehicle, where they occupy a considerable area, thus limiting the available space for carrying other loads.

Both of these types of welders are relatively expensive and neither of them meets the need for a compact low cost welding generator adapted to be carried on a light pick-up truck or passenger car not equipped with a suitable power take-off shaft. My improved generator attachment is located under the hood of the motor vehicle and in no way interferes with normal uses of conventional low cost motor vehicles, while providing electric welding equipment which is readily available when needed. My invention is particularly adapted to meet the need for a low cost attachment of the class described for occasional use on emergency service vehicles.

In the accompanying drawing, my improved electric generator attachment is illustrated by way of example and not for the purpose of limitation in connection with an internal combustion engine of a common type used on motor vehicles.

Referring to the drawing:

Figure 1 is a side elevational view showing my generator attachment, together with fragmentary portions of an internal combustion engine of common type, and the pertinent vehicle frame members, and Fig. 2 is a front end view showing the generator attachment and driving connection between the engine crankshaft and generator, all located under the hood enclosing the vehicle engine.

In the drawing, an electric generator of capacity suitable for welding, e.g., of approximately 200 ampere output, is indicated by the numeral 3. Output cables are indicated at 4 and 5 respectively. The cable 4 has a clamp terminal 6 of common type for attachment to a work piece, and the cable 5 has a terminal handle 7, also of common type adapted to carry a welding rod 8 for contact with a work piece indicated at 9.

Portions of a motor vehicle which are shown somewhat diagrammatically include an internal combustion engine indicated generally at 10, resiliently supported on parallel frame members 11 and a side frame member 12 extending substantially horizontally along one side of the engine 10. The crank-shaft of the engine projects from the front end of the crank case in axial alignment with a bolt 13 for operatively connecting the generator 3 to the crank-shaft, as hereinafter more fully described. Other illustrated elements of the motor vehicle are a crank case 14, a cylinder block 15, and a fan shaft 16 carrying a fan adapted to be driven in the usual manner by a V belt 17 trained on pulleys mounted respectively on the fan shaft and crank-shaft 13. A fragmentary portion of the vehicle hood enclosing the engine is indicated at 18.

To support the generator 3, I provide a main bracket having a horizontal member 19 and leg members 19a and 19b rising from the frame member 12 and connected thereto. Member 19 extends along the lower side of the generator and is secured thereto by a suitable means such as bolts 20. Leg members 19a and 19b are secured to the frame member 12 by bolts 21, and interposed between the leg members and frame member 12 are resilient cushion blocks 22 which permit limited vibration and lateral movement of the generator relative to the frame member 12.

Link means indicated generally at 23 connect the generator 3 to the upper portion of the motor block 15. As illustrated, the link means comprises a pair of parallel arms 24 spaced along the generator and each pivotally connected to the generator and motor block. Each arm 24 has a member 25 connecting it to the generator and a member 26 connecting its other end to the engine block. Pivot means 27 join the ends of the arms 24 to the members 25 and 26. Such link means permit limited vibration and vertical movement of the engine relative to the generator 3 and make it feasible to link the generator to conventional vehicle engines that are resiliently supported on the frames of the vehicles. Thus the vehicle engine 10 is free to vibrate laterally and vertically and lateral vibratory motion is transmitted through the arms 24 to the generator 3, the latter being free to vibrate on its supporting cushion blocks 22.

Power for driving the generator 3 is transmitted from the bolt 13 connected to the engine crank shaft through a flexible drive member or chain 28 trained on a driving sprocket wheel 30 fixed on a central shaft 3a of the generator 3. Driving tension is maintained in the chain 28 by an idler sprocket wheel 31 mounted on a supporting arm 32. The latter has a pivot connection 33 with the bracket leg member 19a and is biased upwardly at its other end, being supported by a spring 33a. The upper end of this spring is anchored on a rigid member 34 projecting from the engine block 15.

My generator attaching and driving means may be mounted on a large proportion of the present day conventional light trucks or on some of the present day passenger cars without substantial alteration of the vehicle elements. All that is required in most instances is the drilling of holes for the bolts 13, 22 and those connecting the members 26 to the engine block and the tapping of the holes for the latter and for the bolt 13 at the front end of the engine crank-shaft. Sprocket wheel 29 is then secured to the crank shaft and the chain 28 assembled in a manner which will be evident from the drawing. Bracket members 19, 19a and 19b of various sizes and shapes may be required to adapt my attachment to fit vehicles of various types and makes, and it may also be necessary to provide modifications of the link means 23 for various installations.

When the welding equipment is to be used, the vehicle engine is operated and brought up to the speed required to generate the welding current in a manner well known in the art. Ordinarily, a governor connected to the engine throttle is used to maintain a steady flow of current from the generator 3 during the welding operation. At times when the welder is not in use, the generator 3 may be disconnected from its power source merely by removing the drive chain 28 from the sprocket wheels 29 and 30. Since the generator is mounted beneath the engine hood, this welding attachment and its driving mechanism in no way interferes with other uses of the vehicle.

I claim:

1. A welding generator attachment for motor vehicles comprising, in combination, a vehicle having an engine, a longitudinal frame member extending substantially horizontally at one side of said engine and a hood enclosing said motor and frame member, said engine having a power shaft which is accessible at the front end thereof, a supporting bracket for a welding generator secured to and projecting above said frame member beneath said hood, a welding generator secured to said bracket beneath said hood, laterally extending link means connecting said generator to the upper portion of said motor, said link means having pivotal connections with the generator and vehicle motor whereby limited vertical movement of the motor relative to the generator is permitted, resilient cushion means interposed between said generator and said frame member permitting vibration of the generator relative to the frame, and flexible power transmitting means operatively connecting said power shaft to said generator.

2. A welding generator attachment in accordance with claim 1 in which said power shaft comprises the crank shaft of the vehicle engine and said flexible power transmitting means includes a driving wheel fixed on the front end of said crank shaft.

3. A welding generator attachment in accordance with claim 1 in which said supporting bracket comprises a substantially horizontally extending member secured to the lower side of said generator, the leg members extending downwardly from said substantially horizontally extending member and connected to said longitudinal frame member.

4. A welding generator attachment in accordance with claim 1 in which said link means comprise a plurality of substantially horizontal arm members extending laterally between the generator and vehicle engine and each pivotally connected to the generator at one end and to the vehicle engine at the other end.

References Cited in the file of this patent

UNITED STATES PATENTS

| | | |
|---|---|---|
| 1,249,308 | Richards | Dec. 11, 1917 |
| 1,380,113 | Moses | May 3, 1921 |
| 2,100,076 | Gilmore | Nov. 23, 1937 |
| 2,310,081 | Hill | Feb. 2, 1943 |